United States Patent [19]

O'Connor, Jr.

[11] Patent Number: 4,769,920
[45] Date of Patent: Sep. 13, 1988

[54] APPARATUS FOR GUIDING A ROUTER TO CUT GROOVES FOR STAIR TREADS AND THE LIKE

[76] Inventor: Richard W. O'Connor, Jr., 40 Newport Ave., West Hartford, Conn. 06107

[21] Appl. No.: 39,696

[22] Filed: Apr. 20, 1987

[51] Int. Cl.⁴ .............................................. B27C 5/00
[52] U.S. Cl. ....................................... 33/562; 33/664; 144/144.5 R; 144/136 B
[58] Field of Search ............ 33/562, 664; 144/144 R, 144/144.5 R, 144.5 CT, 134 R, 136 B

[56] References Cited

U.S. PATENT DOCUMENTS

| | | | |
|---|---|---|---|
| 661,539 | 11/1900 | Krauss | 33/562 |
| 831,204 | 9/1906 | Woolf | 144/144.5 |
| 1,352,196 | 9/1920 | Hunter | 144/136 B |
| 1,615,213 | 1/1927 | Carter | 144/144.5 |
| 3,015,164 | 1/1962 | Antell | 33/562 X |
| 3,250,014 | 5/1966 | Watson | 33/664 |
| 3,985,168 | 10/1976 | Lundquist | 33/562 X |
| 4,605,048 | 8/1986 | Swartout et al. | 144/134 R |

Primary Examiner—William D. Martin, Jr.
Attorney, Agent, or Firm—Robert S. Smith

[57] ABSTRACT

Apparatus for cutting a plurality of generally parallel channels such as the steps and risers in a stringer for a staircase or the shelves in a book case which includes an elongated first, second, third and fourth members. Each member has first and second ends. The second end of the first member is pivotally connected to the first end of the second member, the second end of the second member is pivotally connected to the first end of the third member, the second end of the third member is pivotally connected to the first end of the fourth member and the second end of the fourth member is pivotally connected to the first end of the first member. The first, second, third and fourth members define a parallelogram with pivotable connections at the respective points of connection of the respective members. The angles intermediate pivotally connected members are adjustable by relative pivotable motion between the respective pivotally connected members. The third member includes at least one elongated slot for guiding an associated router to cut an elongated channel and the third member includes apparatus for guiding or indexing the apparatus on a prior cut such as a prior cut for a stair step, stair riser or shelf.

15 Claims, 5 Drawing Sheets

APPARATUS FOR GUIDING A ROUTER TO CUT GROOVES FOR STAIR TREADS AND THE LIKE

BACKGROUND OF THE INVENTION

The present invention relates to routing templates and more particularly to such templates that are intended for routing grooves in stair stringers or timbers.

A variety of templates have been developed for such a purpose. Typically, such a template includes a body plate which is placed upon the stringer and which contains mutually parallel slots that serve as guides for the a cutter. This permits the routing of grooves on the stringer for receiving the boards that will be the treads and risers.

The material prior art includes the following U.S. Pat. Nos.:

1,552,881; J. F. Rose
1,615,213; R. L. Carter
1,751,816; S. Hunter
3,478,434; F. R. Catalano
4,580,352; C. O. Wilson
4,605,048; Swartout et al Rose's device is designed to be used on a spindle molding machine, with the cutter operating on the underside of the stringer, with the template and guide pin on on top of the stringer. The stringer and template combination must be moved to achieve the routing action. The template must be reset for each cut and the template does not locate on the prior cut.

Carter's apparatus has a cumbersome reversing arrangement, and the positions for each template location have to be individually laid out: the template does not locate on the prior cut.

Hunter's device permits adjustability of the stair angle, but to make a left-hand stringer cut it is necessary to unclamp and reset the adjustable template plate. This device does not locate from the prior cut.

Swartout's design permits adjustment of angle and riser height, but depends on a fixed tread length. It does not locate a cut from a prior cut.

Wilson's and Catalano's devices, although described as templates, are used only for laying out the locations of the various grooves; they are not templates that guide the router cutter.

The prior art has not been wholly for the reasons indicated and other reasons.

It is an object of this invention to provide a routing template with automatic and accurate groove location by locating each cut from a preceding cut.

It is another object of this invention to provide a routing template that requires no adjustment or resetting to cut both a right hand and left hand stringer, thereby promoting accuracy and facilitating use.

It is another object of this invention to provide a routing template that does not require layout lines to be drawn on the stringer to denote groove locations.

It is yet another object of this invention to provide a routing template that has adjustments to accommodate variations in both riser and tread length dimensions.

Other objects and advantages of this invention will become apparent from the following description when taken in conjunction with the accompanying drawing.

SUMMARY OF THE INVENTION

It has now been found that these and other objects of the invention may be attained in apparatus for cutting a plurality of generally parallel channels such as the steps and risers in a stringer for a staircase or the shelves in a book case which includes an elongated first member, an elongated second member, an elongated third member, and an elongated fourth member, each member has first and second ends, the second end of the first member is pivotally connected to the first end of the second member, the second end of the second member is pivotally connect to the first end of the third member, the second end of the third member is pivotally connected to the first end of the fourth member and the second end of the fourth member is pivotally connected to the first end of the first member. The first, second, third and fourth members defining a parallelogram with pivotable connections at the respective points of connection of the respective members, the angles intermediate pivotally connected members is adjustable by relative pivotable motion between pivotally connected members. The third member includes at least one elongated slot for guiding an associated router to cut an elongated channel. One of the members, which may be the third member may include means for guiding or indexing the apparatus on a prior cut such as a prior cut for a stair step, stair riser or shelf.

The apparatus may include means for guiding or indexing on the side of an associated timber in which the plurality of channels is to be cut such as the stringer for a stairway. The means for guiding or indexing on the side of an associated timber may include means disposed on both the first member and the third member. The means for guiding on the side of the associated timber may be disposed in generally upstanding relationship to the first and third members and the means for guiding or indexing on a prior cut may comprise a pair of upstanding elements extending from the first element at axially spaced points.

In some forms of the invention the upstanding elements are generally cylindrical; the apparatus includes means for adjusting the location of the pivot points in the elements to vary the distance between opposed members, and the means for varying the distance between the first and third elements comprises slots disposed at the first end of the second member and the second end of the fourth member, the slots allow relative movement of the first member with respect to second and fourth members to vary the distance intermediate the first and third members.

In some forms of the invention the apparatus includes means for moving the location of the upstanding elements to vary the location of the channel to be cut in the associated stringer or other member with respect to an edge thereof and reference indicia are disposed on the first and third members, each reference indicia is disposed the same distance from the pivotable connection to the fourth member. The apparatus may also include means for measuring an angle intermediate at least two of the members and an additional slot in the third member for guiding an associated router in cutting a channel for a riser in a stairway. The slot for a step and the slot for a riser may intercept to form a single L-shaped slot for guiding a router to subatantially simultaneously cut the channel for a riser and a step.

BRIEF DESCRIPTION OF THE DRAWING

The invention will be better understood by reference to the accompanying drawing in which.

DESCRIPTION OF THE PREFERRED EMBODIMENT

Figure 1:
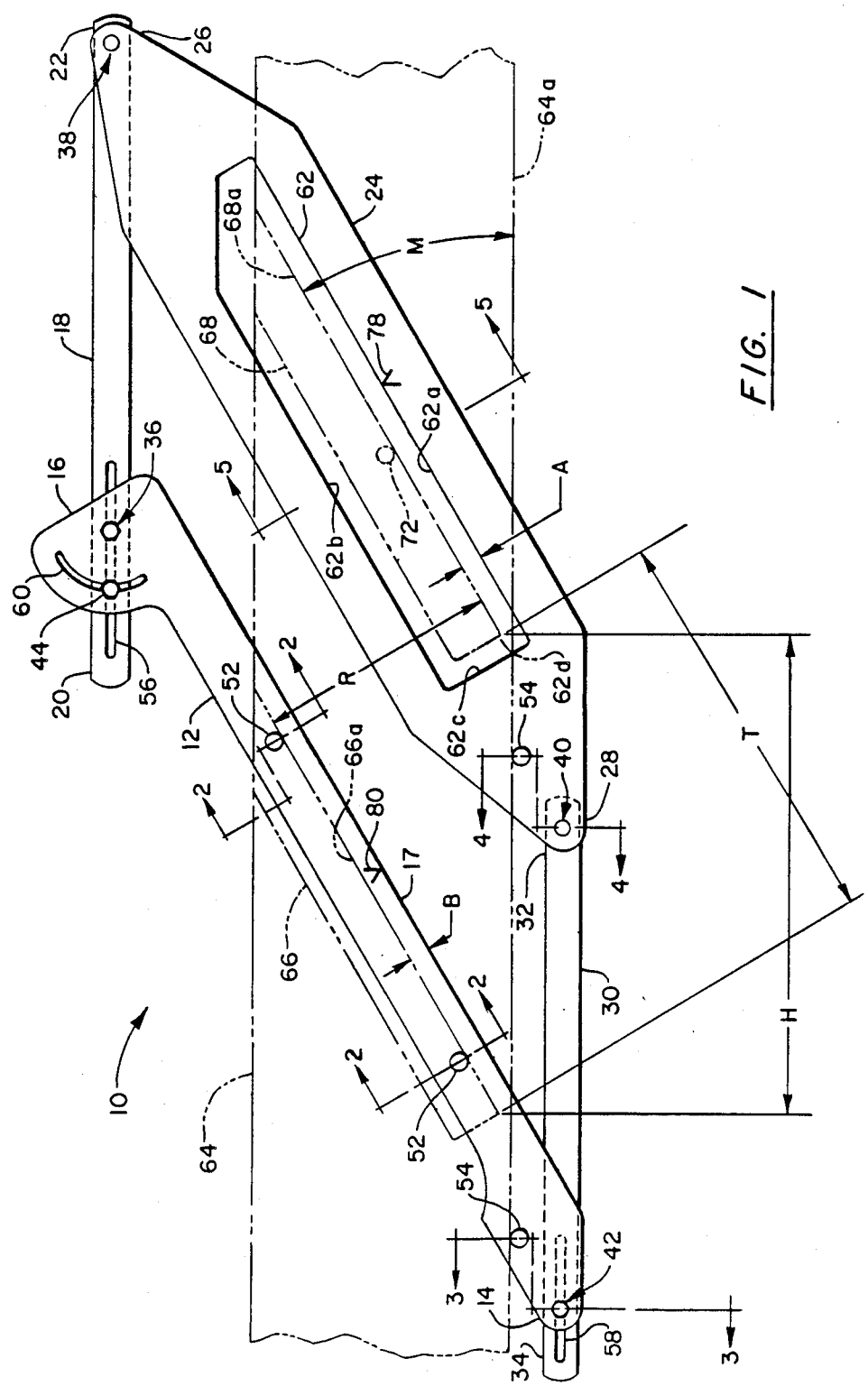
FIG. 1 is a plan view of a template apparatus constructed in accordance with this invention.

Referring now to FIG. 1, there is shown one form of the apparatus in accordance with the invention including a template assembly 10 which is comprised of a first elongated member 12, a second elongated member 18, a third elongated member 24, and a fourth elongated member 30. These members are generally planar in form, and typically would be fabricated from aluminum alloy plate approximately 0.25 in. in thickness. Each member has a first and second end. The second end 16 of first member 12 is joined to the first end 20 of second member 18 by means of a pivotal connection 36. The second end 22 of second member 18 is joined to the first end 26 of third member 24 by means of a pivotal connection 38. The second end 28 of the third member 24 is joined to the first end 32 of the fourth member 30 by means of a pivotal connection 42. The second end 34 of the fourth member 30 is joined to the first end 14 of the first member 12.

Figure 3:
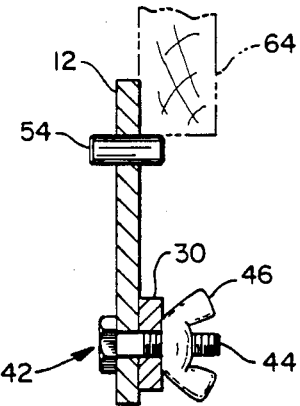
FIG. 3 is a sectional view taken along lines 3—3 of FIG. 1.
Figure 4:
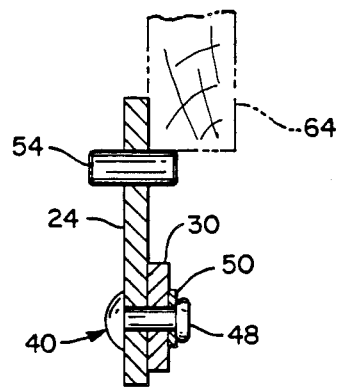
FIG. 4 is a sectional view taken along lines 4—4 of FIG. 1.

The pivotal connections 36 and 42 may be identical, and, as shown in FIG. 3, consist of a bolt 44 and a wing nut 46. The pivotal connections 38 and 40 may be identical, and, as shown in FIG. 4, consist of a rivet 48 and a washer 50. The rivet 48 is headed over to provide a permanent, close fitting, but pivotable joint.

The second member 18 contains an elongated axial slot 56 near its first end 20; The fourth member 30 contains a similar slot 58 near its second end 34. Slots 56 and 58 are of a width to accommodate the diameter of the bolts 44, and of a length to provide a desired range of adjustability of the template 10. In addition, the second end 16 of first member 12 is enlarged in area to accommodate an arcuate slot 60, which has the form of a circular arc whose center lies at the pivotal connection 36. Through the opening existing where the slot 56 crosses the slot 60, a third bolt 44 and a third wing nut 46 are assembled. When the four members 12, 18, 24, and 30 have been adjusted to their desired relationship (which will be described later), the wing nuts 46 at each of the locations 36, 37, and 42 are tightened securely, making the template ready for use.

Figure 2:
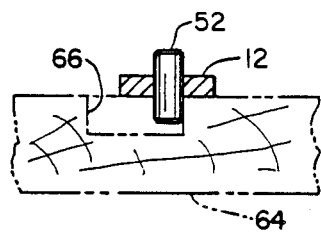
FIG. 2 is a sectional view taken along lines 2—2 of FIG. 1.

In the central region of the first member 12 there are located two pins 52, axially disposed one from the other, and lying on a line that is parallel to the edge 17 of the first member 12. These are the pins that will be positioned in the prior cut 66 and help to locate the template 10 in its proper position for use. As may be seen in FIG. 2, pins 52 are pressed into the first member 12 and extend both above and below the surfaces of member 12. This allows the template 10 to be flipped over in use so that both a right and left hand stair stringer may be cut.

The template 10 is further located against the stair stringer 64 by means of two locating pins 54, one in first member 12, and one in third member 24. These pins may be identical with pins 52; they also extend on both sides of their respective members, as shown in FIGS. 3 and 4. In the first member 12, the line of centers of pin 54 and the pivotal connection 42 lies parallel to edge 17, also parallel to the line of centers of the pins 52.

In the third member 24 there is an opening 62, the edges of which, 62a, 62b, and 62c, guide the router in making the actual cut. Edge 62a is parallel to edge 62b; edges 62a and 62b are both at right angles to edge 62c. In the third member 24, as in first member 12, there is located the second locating pin 54. The line defined by the respective centers of pin 54 and the pivotable connection 40 lies parallel to edges 62a and 62b. Moreover, the center distance between the pin 54 and pivotable connection 40 is identical to the center distance between the pin 54 and the pivotable connection 42 on the first member 12.

In FIG. 1, are illustrated the elements that make up a particular stair design: R, the rise, or vertical distance from one step to the next; T, the tread, or horizontal length of a step; and angle M, the angle that the stair stringer makes with the horizontal. These quantities are related trigonometrically by the equation;

$$R/T = \tan M$$

If the interval between steps in a direction parallel to the stringer is known, (Distance H in FIG. 1), then the following relationships may be written:

$$R = H \sin M \text{ and}$$

$$T = H \cos M$$

The pivotable connections 36, 38, 40, and 42 permit a variation of the angle M; the slots 56 and 58 permit a variation of the rise R. In FIG. 1, the distance A from the edge 68a of the routed groove 68 to the edge 62a of the guide slot 62 is a function of the router details. On the first member 12, B is the distance from edge 17 to the locating surfaces of the pins 52. To facilitate setup of the template 10 for use, distance B is made equal to A, Further, reference indicia 78 and 80 are placed on edges 62a and 17 respectively. Their location is somewhat arbitrary, but each index mark must be the same distance from locating pin 54 on their respective members 12 and 24.

Figure 6:
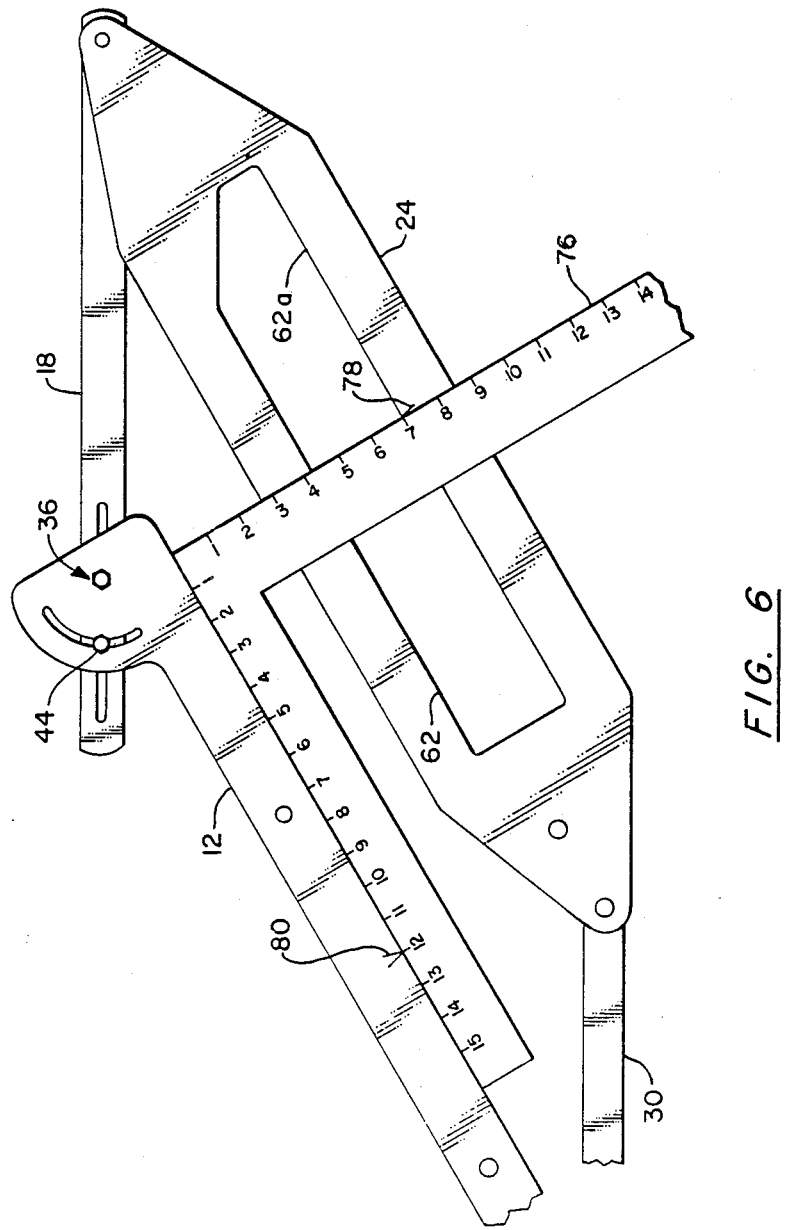
FIG. 6 is a plan view of the template showing the setting of the template for a particular stair configuration.

The adjustment of the template 10 for use may be made on the bench—i.e., no layout on the stair timbers is necessary. All that is needed are the values of the rise, R, and the tread, T, in inches. FIG. 6 illustrates the setting operation, which is accomplished by means of an ordinary carpenter's square 76. No knowledge of trigonometry is neccessary to use the apparatus. In FIG. 6 a rise of seven inches and a tread of twelve inches has been assumed for illustration. One arm of the square 76 is held along edge 17 with the twelve inch graduation aligned with the index mark 80. The template 10 is then adjusted by means of the pivotal connections 36, 38, 40, 42, and the slots 56 and 58 until (a) the seven inch graduation on the other arm of the square 76 matches up the index mark 78 and (b) edge 17 of the first member 12 is parallel with edge 62a on the third member 24. This can easily be determined by making sure that the entire length of edge 62a coincides with the seven inch graduation on the square 76. When proper relationship of the members of template 10 is accomplished, the wing nuts 46 at 36, 37, and 42 are tightened securely. The template 10 is then ready for use.

When making an initial cut on a stair stringer, it should be noted that a prior cut does not exist. To accomplish an initial cut, then, the bottom end of the stair timber is trimmed off at the appropriate angle M by sawing. The lower end surface thus produced serves as a locating surface for the pins 52 when the initial router cut is made.

To place the template 10 in proper position for a cut, pins 52 are brought against edge 66a of the prior cut (or against the lower end surface of the stair timber 64 as described above), and held against that surface while pins 54 are brought against the edge 64a of the stair timber 64. While in this position, the template 10 is clamped securely against the stair timber 64 with suitable C-clamps (not shown). Now, using slot 62 as a guide, the router cut may be made.

Figure 5:
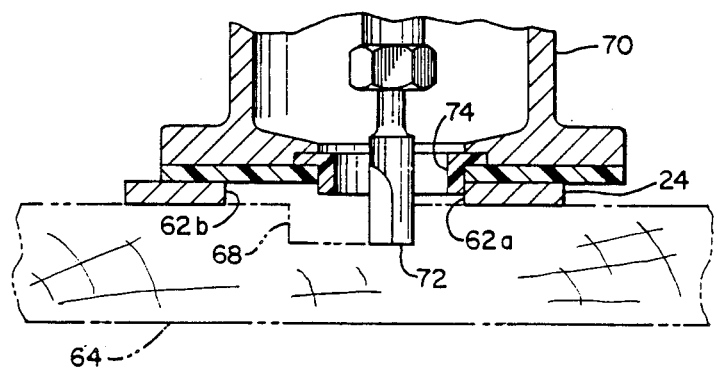
FIG. 5 is a sectional view taken along lines 5—5 of FIG. 1.

FIG. 5 shows a sectional view through the router 70, template 10, and timber 64 as the cut is is made. Router details may vary; illustrated in FIG. 5 is a router 70 fitted with a bushing 74 which rides against the slot edges 62a, 62b, and 62c. The router 70 carries a router bit 72. Actual dimensions of the guide slot 62 are determined by the diameters of the bushing 74 and router bit 72.

Figure 7:
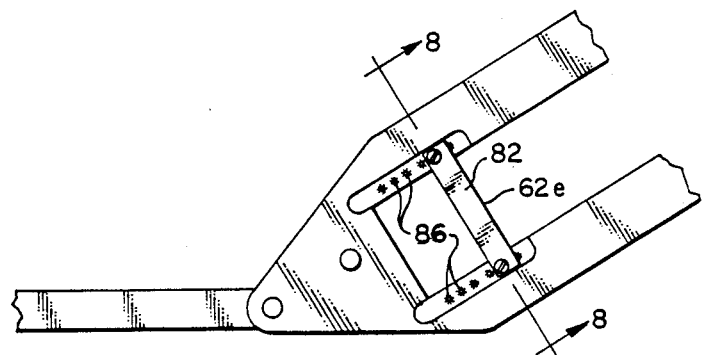
FIG. 7 is a plan view showing another embodiment of a feature of the template.
Figure 8:
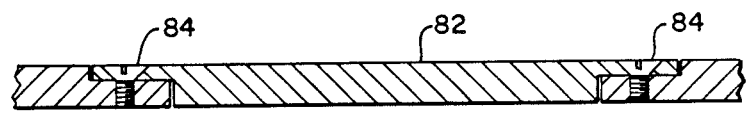
FIG. 8 is a sectional view taken along lines 7—7 of FIG. 7.

Ordinarily, it is desirable to bring corner 62d of slot 62 fairly close to the edge 64a of timber 64, perhaps 0.25 or 0.38 in. It will be noted that as angle M is increased, the corner 62d will shift further away from the timber edge 64a. If this proves undesirable, then a slot configuration as shown in FIGS. 7 and 8 may be used. This arrangement provides, in effect, a movable edge 62e in place of the fixed edge 62c. A bar 82 is secured to the third member 24 with screws 84. Its position may be changed in discrete increments by means of a multiplicity of tapped holes 86. The ends of bar 82 are stepped such that flush surfaces are provided on both the top and underside of the third member 24. The bar 82 may now be assembled in a position as required to keep the corner 62d in acceptable relationship to the edge 64a of the stair timber 64.

Figure 9:
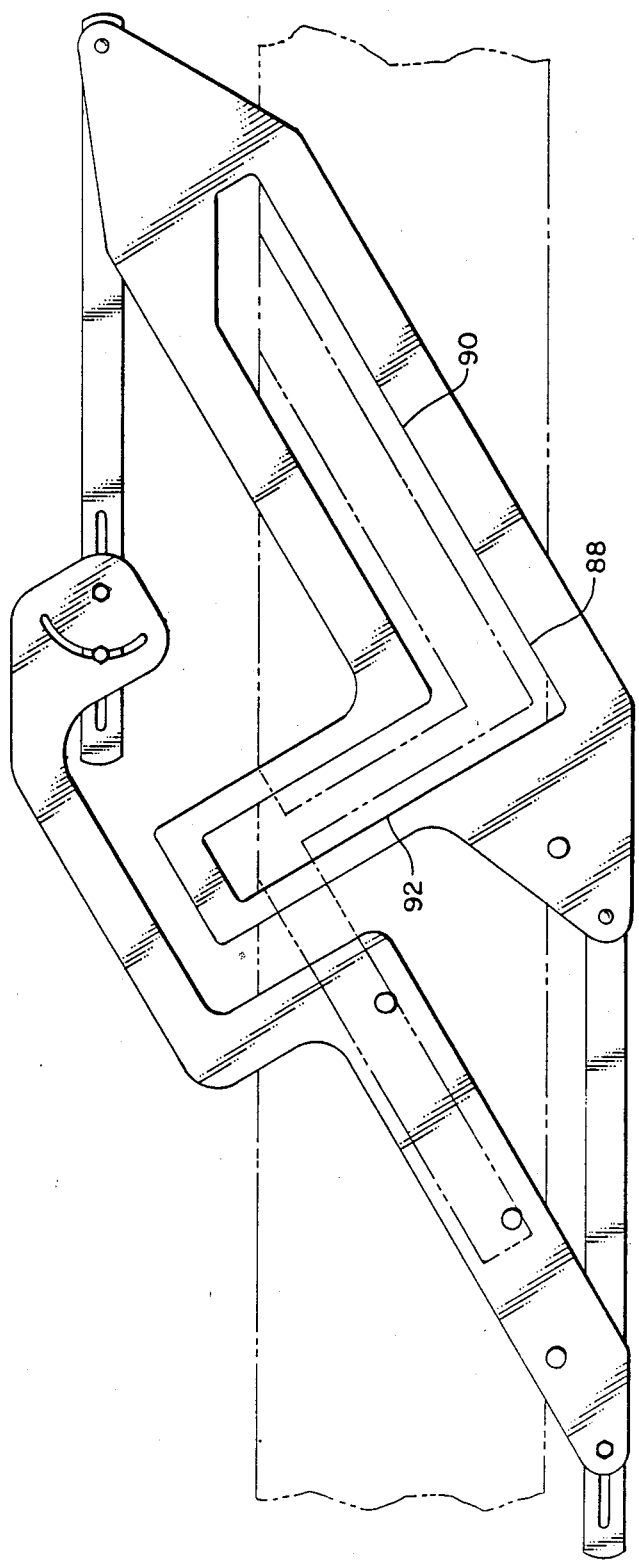
FIG. 9 is a plan view of another embodiment of the template.

The template 10 has particular application when it is intended to provide only treads between timbers, with no risers between treads. With some alteration in design, however, the guide slot 62 can be adapted to incorporate a right-angle portion so that a tread groove and a riser groove may be routed at any given setting of the template 10. This is shown in FIG. 9 where guide slot 88 is comprised of tread portion 90 and riser portion 92.

Various alternative constructions will be apparent to those skilled in the art. It is intended that the scope of the invention be limited only by the appended claims.

I claim:

1. Apparatus for cutting a plurality of generally parallel channels such as the steps in risers and a stringer for a staircase or the shelves in a book case which comprises:
    an elongated first member;
    an elongated second member;
    an elongated third member;
    an elongated fourth member;
    each member has first and second ends, the second end of said first member is pivotally connected to said first end of said second member, said second end of said second member being pivotally connect to said first end of said third member, said second end of said third member being pivotally connected to said first end of said fourth member and said second end of said fourth member being pivotally connected to said first end of said first member, said first, second, third and fourth members defining a parallelogram with pivotable connections at the respective points of connection of the respective members, the angles intermediate pivotally connected members being adjustable by relative pivotable motion between pivotally connected members;
    said third member including at least one elongated slot for guiding an associated router to cut an elongated channel;
    one of said members includes means for guiding or indexing the apparatus on a prior cut such as a prior cut for a stair step, stair riser or shelf.

2. The apparatus as described in claim 1 wherein: said means for guiding or indexing on a prior cut is at least a part of said third member.

3. The apparatus as described in claim 2 wherein: said means for guiding or indexing cooperates with the side of an associated timber in which a plurality of channels is to be cut such as the stringer for a stairway.

4. The apparatus as described in claim 3 wherein: said means for guiding or indexing cooperating with the side of an associated timber includes means disposed on said first member and said third member.

5. The apparatus as described in claim 4 wherein: said means for guiding or indexing cooperating with the side of the associated timber comprises elements disposed in generally upstanding relationship to said first and third members.

6. The apparatus as described in claim 5 wherein: said means for guiding or indexing cooperating with a prior cut comprises a pair of upstanding elements extending from said first element at axially spaced points.

7. The apparatus as described in claim 6 wherein: said upstanding elements are generally cylindrical.

8. The apparatus as described in claim 6 wherein: said apparatus includes means for adjusting the location of the pivot points in said elements to vary the distance between opposed members.

9. The apparatus as described in claim 8 wherein: said means for varying the distance between said first and third elements comprises slots disposed at the first end of said second member and said second end of said fourth member, said slots allowing relative movement of said first member with respect to second and fourth members to vary the distance intermediate said first and third members.

10. The apparatus as described in claim 9 wherein: said apparatus includes means for moving the location of said upstanding elements to vary the location of the channel to be cut in the associated stringer or other member with respect to an edge thereof.

11. The apparatus as described in claim 10 further including:

reference indicia disposed on said first and third members, each reference indicia being disposed the same distance from the pivotable connection to said fourth member.

12. The apparatus as described in claim 11 further including:
    means for measuring an angle intermediate at least two of said members.

13. The apparatus as described in claim 12 further including:
    an additional slot in said third member for guiding an associated router in cutting a channel for a riser in a stairway.

14. The apparatus as described in claim 13 wherein:
    said slot for a step and said slot for a riser intercept to form a single L-shaped slot for guiding a router to substantially simultaneously cut the channel for a riser and a step.

15. The apparatus as described in claim 12 further including:
    means for varying the effective length of said slot in said third member.

* * * * *